INVENTOR
HENRI LEO VAN LOMMEL
BY Hugh A. Kirk
ATTORNEY

INVENTOR
HENRI LEO VAN LOMMEL
BY Hugh A Kirk
ATTORNEY

INVENTOR
HENRI LEO VAN LOMMEL
BY Hugh A. Kirk
ATTORNEY

April 20, 1954 H. L. VAN LOMMEL 2,676,205

TELECOMMUNICATION REPEATER CIRCUIT

Filed May 27, 1950 4 Sheets-Sheet 4

INVENTOR
HENRI LEO VAN LOMMEL
BY Hugh A. Kirk
ATTORNEY

Patented Apr. 20, 1954

2,676,205

UNITED STATES PATENT OFFICE 2,676,205

TELECOMMUNICATION REPEATER CIRCUIT

Henri Leo van Lommel, The Hague, Netherlands, assignor to Staatsbedrijf der Posterijen, Telegrafie en Telefonie, The Hague, Netherlands, a corporation of the Netherlands Application May 27, 1950, Serial No. 164,666

24 Claims. (Cl. 178—70)

This invention relates to a repeater circuit for communicating signals of the telegraphic or impulse type. More particularly it deals with a four-wire–two-wire telegraph repeater in which a four-wire connection is employed from the repeater circuit to a channel suitable for simultaneous transmission and reception of double current impulses, and a two-wire connection is employed from the repeater circuit to a subscriber's telegraph set suitable only for alternate transmission and reception of single current impulses.

Long lines for the conduction of single current telegraph signals between the subscriber's set and the repeater produce distortion due to the electrical characteristics of the line itself and/or the presence of transient and phantom circuits produced in the line during communications. In order to detect single current impulse signals at the repeater from a far subscriber's set, sensitive polarized receiving relays should be employed, but such sensitive relays are easily operated also by transient currents in the line, thus producing erroneous signals and/or unwanted operation of the receiving relay. Several different types of circuits have been developed to try to compensate automatically for these transients and distortions, two types of which will be described in more detail later, but all have some difficulties.

It is an object of this invention to produce a simple, economical, effective and efficient repeater circuit which is practically independent of transients which occur in the lines connected to it.

Another object is to produce such a repeater circuit having a sensitive polarized receiving relay which does not operate by transients or other unwanted disturbances in this line to which it is connected, and also will under no conditions be energized by a current less than the minimum current passing through said relay when it is in its normal rest condition.

Another object is to produce a two-way telegraph repeater in which the distortion produced by signals being communicated through it in one way or direction will not start or affect the apparatus in the repeater for communication of signals in the other direction.

Another object is to produce a telegraph repeater circuit in which the receiving relay therein can be replaced while the circuit is energized without endangering the rest of the circuit.

Another object is to produce a telegraph repeater circuit containing a sensitive polarized receiving relay which need not be bridged to reduce the effect of distortion on the signals.

Generally speaking, the repeater circuit according to this invention comprises a receiving relay connected to a two-wire line to a subscriber's set, and a transmitting relay connected to a four-wire line to the terminating equipment of a telegraph channel. The receiving relay operates an armature which connects positive or negative battery to a pair of wires of the four-wire line, and the transmitting relay operates an armature which connects one pole of a battery in series with the two wires of said two-wire line, or shunts said two wires together through a winding of said receiving relay. Said receiving relay comprises a sensitive polarized relay having at least three separate windings, a first or line winding connected directly to one wire of said subscriber's two-wire line, a second winding to compensate for transient currents in said first winding to prevent operation of said receiving relay when said transmitting armature is operating, and a third winding to compensate for currents in said second and compensating winding. In addition to these three windings, the first and third said windings may comprise a pair of counteracting windings connected in parallel with each other with varistors, i. e. unidirectional resistances such as rectifiers, connected in opposite directions so that when current flows through one of the windings of the pair it cannot flow through the other winding of the pair in the same direction, and vice versa. Each of the windings of said receiving relay are connected to said transmitting armature, and may also include filter type circuits in said connecting circuits, such as a combination of resistances, inductances, and/or condensers, which filter type circuit elements are carefully chosen in value to produce the desired results.

The above mentioned and other features and objects of this invention and the manner of attaining them will become more apparent and the invention itself will be best understood, by reference to the following description comparing the prior art with an embodiment of this invention taken in conjunction with the accompanying drawings, wherein.

Figure 2:
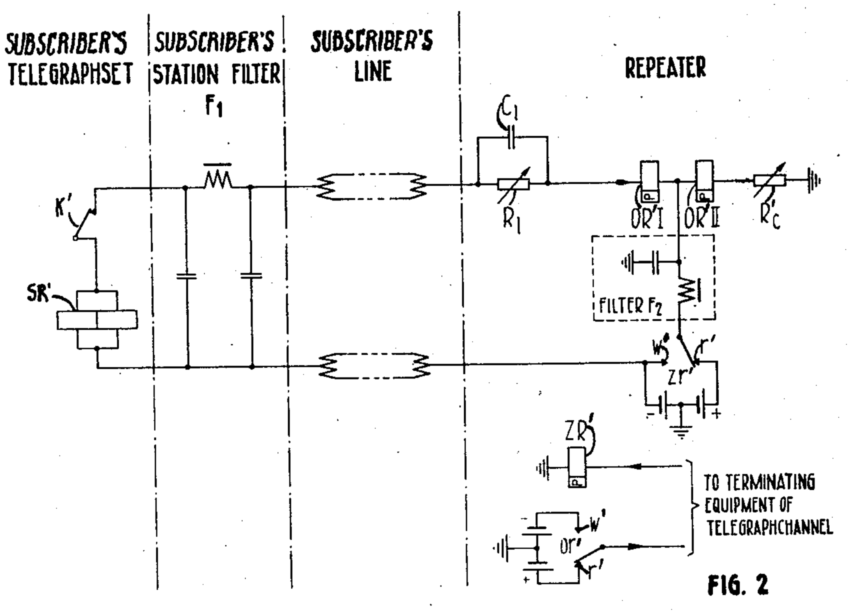
Fig. 2 is a schematic wiring diagram of another known type of telegraph repeater circuit.
Figure 4:
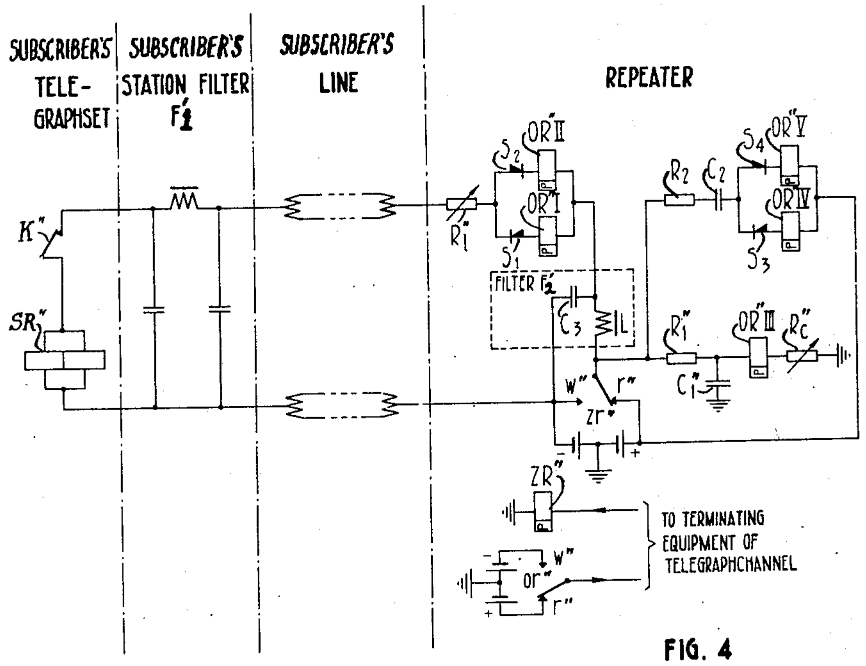
Figure 5:
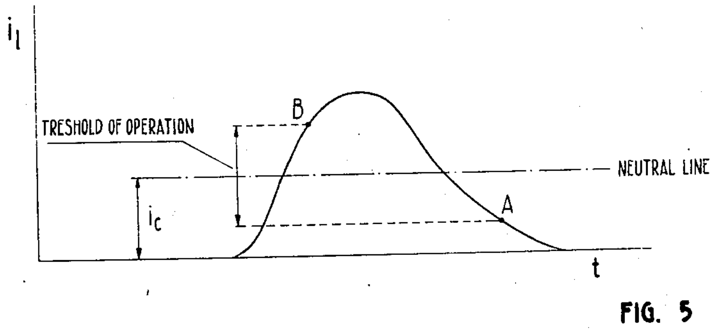

Figs. 3*a* through 3*k* are graphs of the voltage and current flow against time through the receiving relay in Fig. 2 for a signal being sent to the subscriber set;

Fig. 4 is a schematic wiring diagram of a telegraph repeater circuit according to an embodiment of this invention;

Fig. 5 is a graph of a current impulse in the receiving relay of Fig. 4 for a signal sent from the subscriber set; and Figs. 6a through 6g are graphs of the voltage and current flow against time through the receiving relay of Fig. 4 for a signal being sent to the subscriber set.

I. *Prior art*

Figure 1:
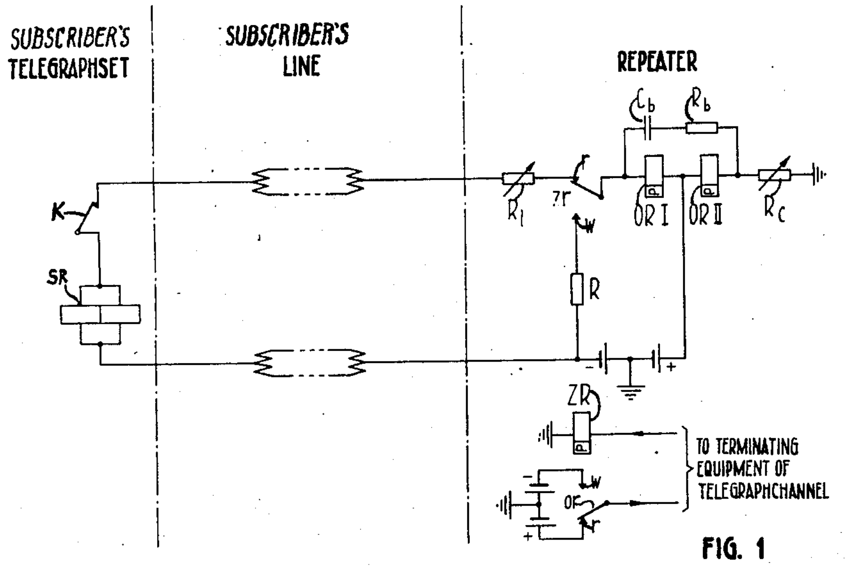
Fig. 1 is a schematic wiring diagram of one known type of telegraph repeater circuit.

Referring first to Figs. 1 and 2 of the prior art repeater circuits, for four-wire–two-wire terminating telegraph equipment, there are shown subscribers' sets at the left comprising keys K and K' and subscribers' receiving relays SR and SR'; in the center there are shown the two wires of the subscribers' lines to the repeater circuits, and the repeater circuits on the right. Each repeater circuit comprises a polarized receiving relay having two separate opposing windings ORI or OR'I and ORII or OR'II, respectively, the former of each of which is connected directly with the subscriber's lines. Winding ORII or OR'II is only connected from one terminal of the battery to the battery's mid-point or ground potential, so that twice as much current flows through winding ORI or OR'I as through ORII or OR'II. The armature *or* or *or'* of the receiving relay connects either positive (*r* or *r'*) or negative (*w* or *w'*) battery in another circuit to the line to the terminating equipment of the telegraph channel, and from this channel polarized transmitting relay ZR or ZR' is energized according to the impulse signals to be repeated by the repeater to be sent to the subscriber's set. Accordingly, the transmitting relay ZR or ZR' has its armature *zr* or *zr'* located in the circuit of the subscriber's two-wire line, connecting said two wire lines normally in rest condition in series through the receiving relay winding ORI or OR'I and full battery with the subscriber's set, or breaking this circuit by the changeover of armature *zr* or *zr'* from its spacing contact *r* or *r'* to its marking contact *w* or *w'*.

According to the circuit in Fig. 1 when this circuit is broken by the operation of *zr*, the whole line capacity which is great when the line is long, discharges through the subscriber's set and thereby would cause the false operation of the relay SR. This is prevented by the circuit in Fig. 2 in which the change-over of armature *zr'* permits discharge of the line in both directions, thereby enabling about twice as long communication lines between the subscriber and the repeater as is possible with the circuit in Fig. 1. The high threshold of operation of the receiving relay in Fig. 1, as well as the bridging circuit of the filter type combination of condenser $C_b$ and resistor $R_b$ across the windings ORI and ORII, avoids to a certain degree the false operation of said receiving relay during change-over time of the armature *zr*, by retarding its operation, but this retardation has the disadvantage of causing irregularities in the adjustment of said relay to produce distortion. Similarly as for shorter lines with the circuit shown in Fig. 2, a filter circuit $F_2$ is provided for the same purpose as the bridging circuit in Fig. 1.

Figures 3A, 3B, 3C, 3D, 3E, 3F, 3G, 3H, 3J, 3K:
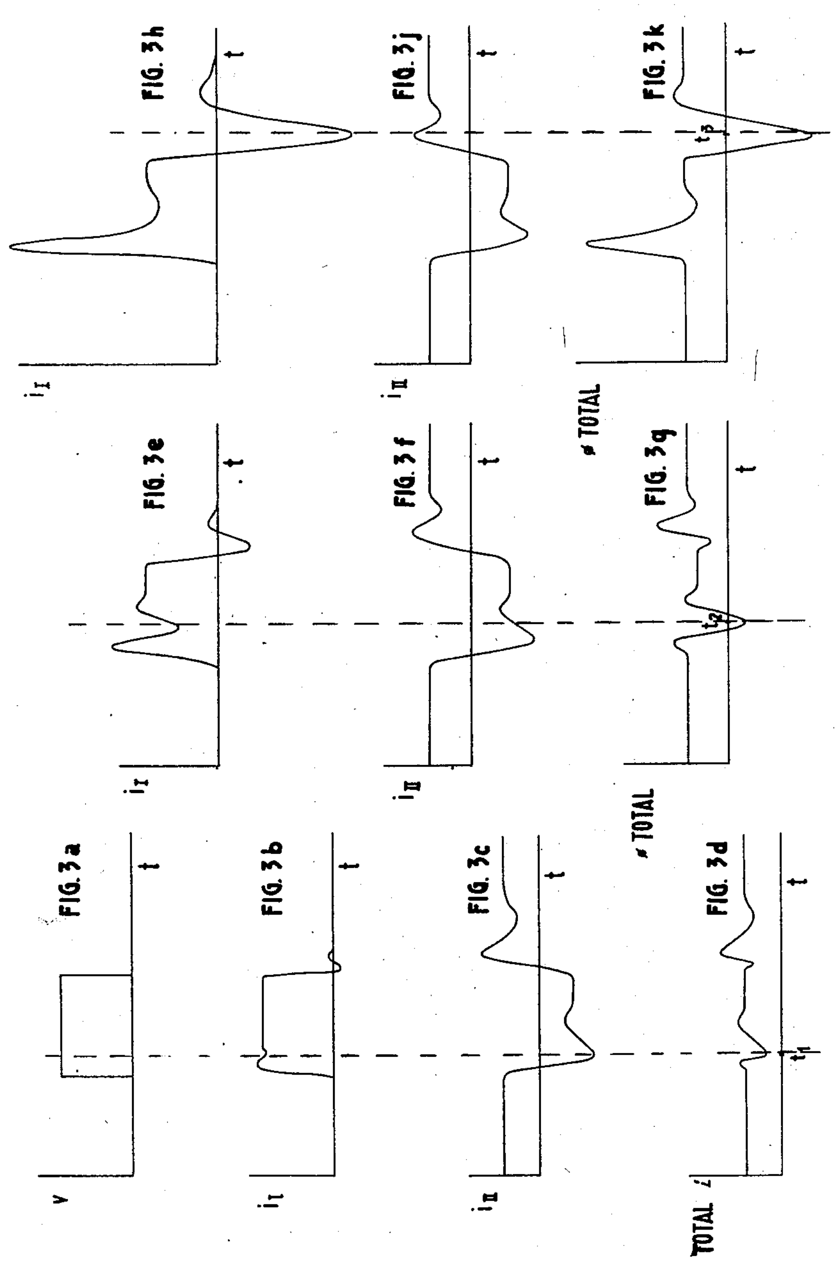

But even the circuit of Fig. 2 produces distortion when a sensitive receiving relay is employed so that the range of the two-wire line may be increased still more, say up to about 60 kilometers. This failure of the circuit in Fig. 2 is illustrated by the graphs in Figs. 3a through 3k. If a pulse signal according to the graph in Fig. 3a is produced by the change-over and back of the armature *zr'* forming one impulse or signal element, the currents which occur in opposing windings OR'I and OR'II are graphically illustrated in Figs. 3b and 3c for a short length of subscriber's line, the algebraic sum of which currents in OR'I and OR'II is illustrated in Fig. 3d, showing that no depressions in the curve not even at $t_1$ fall below the zero threshold for the relay OR' and thereby *or* is maintained in the position shown in Fig. 2 throughout the transmission of signals to the subscriber's set by the alternations of armature *zr'*. If the length of the subscriber's line were increased to 20 kilometers and the same pulse signal were transmitted by armature *zr'*, curves according to Figs. 3e and 3f would be produced for the current flowing through windings OR'I and OR'II, respectively, and a sum total thereof would result in the curve of Fig. 3g which does have a depression at $t_2$ which is below the threshold for the relay and could cause it to operate, but even this may not do so if a proper filter or bridging circuit were employed to retard the curve of Fig. 3f somewhat. Similarly Figs. 3h through 3k correspond to Figs. 3e through 3g, but for a subscriber's line of 60 kilometers length, a final depression at $t_3$ is obtained of such a magnitude that the relay will be falsely and undesirably operated even if bridged by a high valued resistance and condenser. Thus, neither of the two circuits known and used in the prior art can be used without distortion for the communication of pulse signals for 60 kilometers.

II. *The invention*

Referring now to an embodiment of the circuit of this invention as illustrated in Fig. 4 for a repeater connected in a telegraph circuit similarly to those in Figs. 1 and 2 just described, there is shown an additional three more windings for the receiving relay, further filter type circuits and also varistors such as rectifiers. This circuit overcomes all the above mentioned difficulties. There is also shown a filter $F'_1$ at the subscriber's set end of the circuit. The receiving relay of Fig. 4 with its five separate windings is a sensitive polarized relay with each of the windings connected to the armature *zr''* of the transmitting relay ZR'' through some type of a filter circuit in which the values of the elements have been carefully chosen to give the desired results for long and short, or a full range, of subscriber line operation, that is from zero to about 60 or 70 kilometers.

If a low sensitivity high threshold receiving relay were employed in the circuit of Fig. 4 as in the circuits of Figs. 1 and 2, for pulse signals received from the subscriber's set at a great distance, the operation of the receiving relay would occur at the points A and B on the curve of Fig. 5, where its slope is slight giving more chance for distortion, while if a high sensitivity low threshold receiving relay were employed, operation of the relay would occur in relatively steeper parts of the curve in Fig. 5 as indicated at the points where the neutral line cuts said curve. This illustrates the advantage of using a sensitive relay, if possible, and the circuit in Fig. 4 is designed so that such a relay can be used without being operated by transients or irregular currents such as occur in a 60 kilometer subscriber's line during transmission to the subscriber from the repeater by the operation of the armature *zr''*.

Figure 6A:
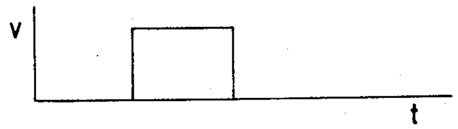

The operation of the circuit in Fig. 4 is best described in connection with Figs. 6a through 6g in which curves of a pulse signal are compared and summarized for each of the five windings of receiving relay OR''. Fig. 6a corresponds to the pulse applied to the circuit by the transmitting armature zr'', and curves of Figs. 6b through 6f correspond respectively to the currents produced in each of the windings OR''I through OR''V, by said pulse signal of Fig. 6a, when the repeater circuit is connected to a 60 kilometer two-wire subscriber line.

Figure 6B:
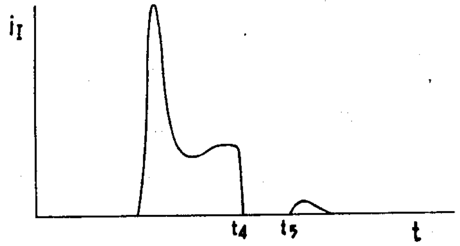
Figure 6C:
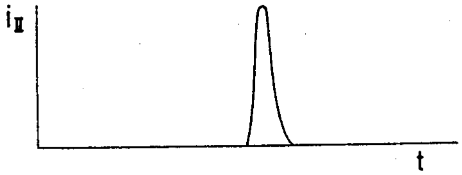

The line windings OR''I and OR''II are connected in parallel to one wire of the subscriber's line in series with separate opposing varistors, such as rectifiers $S_1$ and $S_2$, so that only the surge from the line during the initiation of the pulse will pass through the winding OR''I and rectifier $S_1$, and the negative surge in the line when the signal is cut-off only passes through winding OR''II and rectifier $S_2$, which second winding OR''II is wound so a negative current through it gives a positive field to augment the field of a continued positive field without any negative depressions, see Figs. 6b and 6c. The opposing rectifiers and their windings OR''I and OR''II produce this desirable result between the lines $t_4$ and $t_5$, which is also delayed somewhat by the filter $F'_2$ between said pair of line windings and the armature zr''.

Also connected to the armature zr'' is a compensating winding OR''III through a filter type circuit of resistance $R''_1$ and condenser $C''_1$, the other side of which winding OR''III is connected through an adjustable resistance $R''_c$ to ground, which latter resistance adjusts the effect of said compensating winding. This filter type circuit, however, has the effect of delaying the time when a depression in the current occurs in this compensation winding, so that the current in this winding OR''III does not pass below the zero value (see Fig. 6d) before the line current becomes negative in the case of short lines, as shown at $t_1$ in Figs. 3b through 3d, thereby presenting augmentation of this negative surge which occurs in short lines. The main purpose of the compensating winding OR''III is that it makes the circuit practically independent of transients appearing due to the presence of the filter $F'_2$ and the subscriber's line.

Then, last but not least, in order to compensate for the compensating winding OR''III just described, there may be provided another pair of windings OR''IV and OR''V connected in parallel, each with separate oppositely connected varistors or rectifiers $S_3$ and $S_4$, respectively, which pair of compensating windings for the compensating winding OR''III may be connected through a third filter type circuit of resistance $R_2$ and condenser $C_2$ from the transmitting armature zr'' to one of the poles of the battery, herein the positive pole. The condenser $C_2$ is charged during the time $t_4$ to $t_5$ (see Fig. 6b) during the steep fall of line current at the end of the impulse which creates a field in winding OR''IV to counteract this steep negative surge. The resistance $R_2$ can be placed to the right of the condenser $C_2$, or one of said varistors or rectifiers $S_3$ and $S_4$ may be replaced by a high resistance, without changing the principle and effectiveness of this compensating circuit. The second winding OR''V of this compensating pair is energized by the discharge of the condenser $C_2$, which further insures that during the time $t_1$ mentioned above, the current does not fall below the desired minimum of current for the rest position of the receiving relay OR''. Since this pair of compensating windings is connected with opposing varistors, the same as for the line pair of windings, the graphs of the current flows through them are also both positive, see Figs. 6e and 6f, the former of which aids in compensating for the negative depression of the curve for the compensation of compensating winding OR''III (see Figs. 6d and 6e).

Thus, the auxiliary compensating windings OR''IV and OR''V are so arranged that when they are energized, they apply positive pressures to the armature or'', the same as that for the pair of line windings OR''I and OR''II, respectively, aiding in maintaining the armature or'' in its position of non-communication of signals from the subscriber's set during the sending of all signals to the subscriber's set. Windings OR''IV and OR''V thus also compensate for the effect of winding OR''III which has an opposite effect to that of the other four windings of the receiving relay OR''.

Figure 6D:
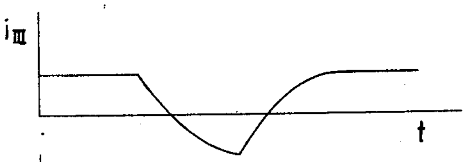
Figure 6E:
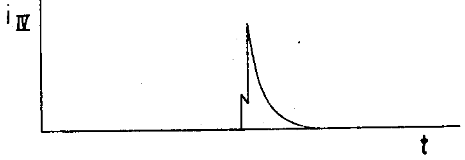
Figure 6F:
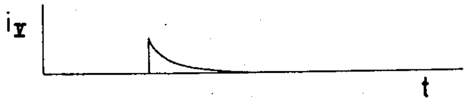

By comparison of the curves of Fig. 6, it can be seen that the algebraic summation of only the three curves of Figs. 6b, 6d and 6e, corresponding to the effect of windings OR''I, OR''III and OR''IV (and omitting curves of Figs. 6c and 6f corresponding to windings OR''II and OR''V), still would produce a curve in which no negative current, or current below the minimum rest current $i_m$ shown in Fig. 6g, would be obtained. Accordingly, these auxiliary parallel windings OR''II and OR''V are supplemental to the proper operation of this invention provided means for preventing the current from going below a given level, such as for example the two pairs of rectifiers S1, S2, S3 and S4, are employed, so that no negative dip in the curve of Fig. 6b (between $t_4$ and $t_5$) and the curve of Fig. 6e (at $t_1$) will occur.

The connections of the varistors, including rectifiers, in the circuit of Fig. 4 are so protected that the windings of the receiving relay OR'' may be replaced while the current is connected to the circuit without danger of burning out said varistors, which is a material and practical advantage of the circuit of this invention.

Figure 6G:
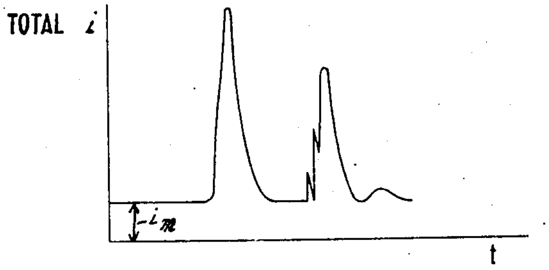

The sum of the currents in all five of the windings of the receiving relay in Fig. 4 produces a very advantageous result as illustrated in Fig. 6g in which the current never at any time due to any distortion falls below the minimum current $i_m$ which is the current for the rest position of the relay, when no signals are being sent through it, and thereby a positive current is continuously maintained through the relay producing a positive field and a positive pressure by armature or'' on its positive contact r'' throughout the sending of pulse signals to the subscriber set over 60 kilometers of two-wire line.

The reception of pulse signals by the repeater circuit in Fig. 4 from the subscriber's set is substantially uneffected by the additional windings of the receiving relay in the circuit. In fact there is no bridging circuit effect to overcome, as in the circuit of Fig. 1, and the inductive effect of the other windings than the line windings of the relay is practically negligible. Thus, the relay OR'' in Fig. 4 is connected in the most favorable condition possible.

In the repeaters for lines belonging to an automatic or manual telegraph switching system, a supervisory relay may be inserted in the circuit of Fig. 4 betwen the armature zr'' and its marking contact $w''$, if desired, without departing from the principle of this invention.

While there is described above the principles of this invention in connection with specific apparatus, it is to be clearly understood that this description is made by way of example and not as a limitation to the scope of this invention.

I claim:

1. In a repeater, a receiving relay for receiving signals from a subscriber over a line, said relay having a coil connected on one end to said line of said subscriber, a battery having two poles, a transmission armature engaging one and the other of said two poles of said battery alternately, the other end of said line coil being connected to said transmission armature, a second coil of said receiving relay acting as a compensating coil, a third coil of said receiving relay being connected to one pole of said battery, a condenser for capacitively coupling said third coil to said transmission armature; a means for charging said condenser between said poles of said battery when said transmission armature engages said other pole of said battery; and a rectifier adapted to pass the charge of said condenser through said third coil when said transmission armature engages said one pole of said battery.

2. A telegraph repeater circuit connected to a line comprising a transmitting armature and a receiving relay having an armature and at least three coils, one coil being connected in series with said line and said transmitting armature, a filter means being connected to another of said coils to maintain said armature of said relay in a given position when said line coil is to be energized from currents in said line, and means connected to said third coil to keep the total currents flowing through all of said coils always from passing below the normal current level of said line coil regardless of the currents passing through said line and said line coil, all three of said coils being connected in parallel with each other and in series with said transmitting armature.

3. A telegraph repeater circuit connected to a line comprising a transmitting armature and a polarized receiving relay having an armature and a plurality of coils, one coil being a line coil and being connected in series with said transmitting armature and said line, another coil being a compensating coil to return the armature of said receiving relay to a given position when insufficient operating current for said relay is passing through said line coil, and circuit means connected to a third one of the coils of said receiving relay to compensate the current in said compensating coil upon operation of said transmitting armature all three of said coils being connected in parallel with each other and in series with said transmitting armature.

4. In a pulse communication repeater circuit connected to a line, a transmitting relay armature alternating between a pair of contacts, a two polarity current source and a receiving relay having at least three windings and an armature controlled by the algebraic total of the current flowing through all said windings, said circuit comprising: means to connect one of said windings to said line and then directly in series with said transmitting armature to the poles of said current source alternately, means to connect a second of said windings to the mid-point of said poles of said current source and then in series with said transmitting armature to the same poles of said current source alternately, and means to connect the third of said windings to one pole of said current source in series with a condenser and said transmitting armature to the same poles of said current source alternately.

5. In a pulse communication repeater circuit connected to a line over which current pulses are to be transmitted by connecting said line alternately to different potential poles of a current source, comprising in series with said line: a winding of a receiving relay which operates by pulses from said line, a transmitting armature which alternately connects with said poles of said current source; said circuit also comprising a second winding of said relay connected between said armature and an intermediate potential point of said poles of said current source, and a third winding of said relay connected between said armature and one of said poles in series with a condenser.

6. The circuit of claim 5 including in series between the first winding of said receiving relay and said armature, a filter.

7. The circuit of claim 5 including in series between said second winding and said armature, a filter.

8. The circuit of claim 5 including in series with said condenser and said third winding, a resistance.

9. The circuit of claim 8 wherein said resistance is unidirectional.

10. The circuit of claim 5 including a fourth winding of said relay in parallel with said first winding, and a pair of rectifiers arranged so that current in one direction passes through said first winding and current in the opposite direction passes through said fourth winding.

11. The circuit of claim 5 including a fourth winding of said relay in parallel with said third winding, and a pair of rectifiers arranged so that current in one direction passes through said third winding and current in the opposite direction passes through said fourth winding.

12. In a signal communication repeater circuit connecting in series with a line, a polarized receiving relay operating an armature, and a transmitting armature for alternating between two contacts of different potential to transmit signals over said line from said repeater, the improvement comprising: means to prevent operation of said receiving relay by currents produced by said signals and surges from said line caused by the making and breaking of said contacts to make said signals, said means comprising: means to normally maintain and return said armature of said polarized receiving relay to rest position when no signals are being transmitted or being received by said relay, means compensating said currents in said receiving relay, and means compensating the currents of said compensating means, all three of said means being connected in parallel with each other and in series with said transmitting armature, whereby the total currents passing through said receiving relay at any time when said relay is in its rest position are never less than a certain minimum for said relay when signals are transmitted through it by alternations of said transmitting armature, which minimum maintains said relay in said rest position.

13. The circuit of claim 12 wherein the first said compensating means includes a filter.

14. The circuit of claim 12 wherein said second compensating means comprises a resistance means.

15. The circuit of claim 12 wherein the second said compensating means includes a separate winding of said relay.

16. The circuit of claim 15 wherein the second said compensating means also includes a condenser.

17. A repeater for signalling systems comprising: a transmitting relay having an armature, a battery having a positive and a negative pole and being grounded midway between said poles, a single current line from said repeater for two-way traffic, said armature being in series with said single current line to short circuit said line, a first pair of opposing rectifiers connected in parallel to said single current line, a polarized receiving relay having a plurality of windings including a line winding connected in series with one of said rectifiers in such a way that only one direction of energization of said receiving relay may be obtained by current through said single current line, a compensation circuit connected between said armature and said ground through another winding of said repeating relay, and an auxiliary circuit for compensating for the effect of said other winding and being connected between said armature and said positive pole of said battery through a second pair of opposing parallel rectifiers, one of which rectifiers being in series with a third winding of said receiving relay, which said third winding is arranged to apply the same direction of energization of said receiving relay as said line winding.

18. A system according to claim 17 including a fourth winding of said receiving relay in series with the other rectifier of said first pair of rectifiers and arranged so that it applies the same direction of energization as said one and said third windings.

19. A system according to claim 17 including a fifth winding in series with the other rectifier of said second pair of rectifiers so that it applies the same direction of energization as said one and said third winding.

20. A system according to claim 17 for two-way telegraph communication wherein said compensating and said auxiliary circuits are shunted out at least in part by said armature when said receiving relay in being operated whereby said circuits have a negligible influence on the operation of said receiving relay.

21. A system according to claim 17 including a filter circuit connected in series with said single current line and said transmitting armature.

22. A system according to claim 17 wherein said compensating circuit includes in series with said other winding an adjustable resistance for regulating the scanning level of said receiving relay.

23. A system according to claim 17 wherein said compensating circuit includes in series with said other winding a delaying means.

24. A system according to claim 17 wherein said auxiliary circuit includes in series with said third winding a resistance and a condenser.

References Cited in the file of this patent

UNITED STATES PATENTS

| Number | Name | Date |
|---|---|---|
| 2,299,969 | Egner et al. | Oct. 27, 1942 |
| 2,466,891 | Hearn | Apr. 12, 1949 |

FOREIGN PATENTS

| Number | Country | Date |
|---|---|---|
| 343,516 | Great Britain | Feb. 20, 1931 |